Figure 1:
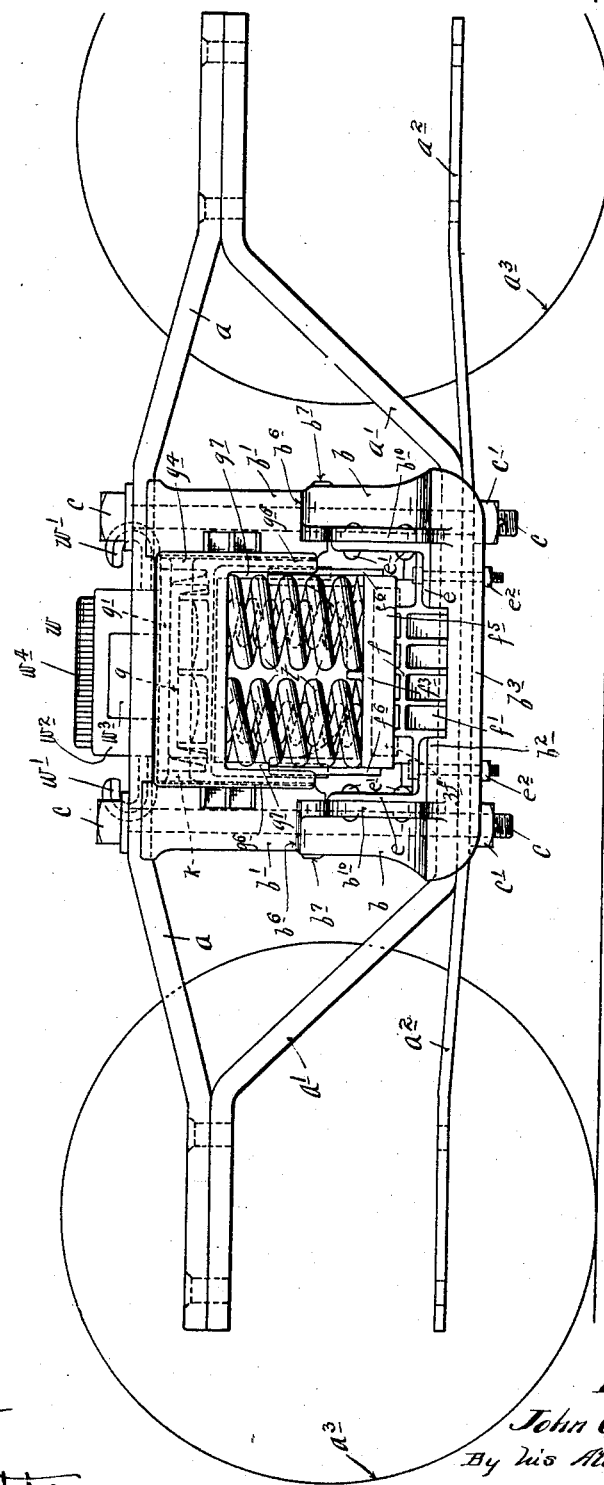

No. 660,614. Patented Oct. 30, 1900.
J. C. BARBER.
CAR TRUCK.
(Application filed Apr. 7, 1900.)
(No Model.) 4 Sheets—Sheet 1.

Witnesses.
Harry Kilgore,
Robert Otto.

Inventor.
John C. Barber,
By his Attorneys.
Williamson & Merchant

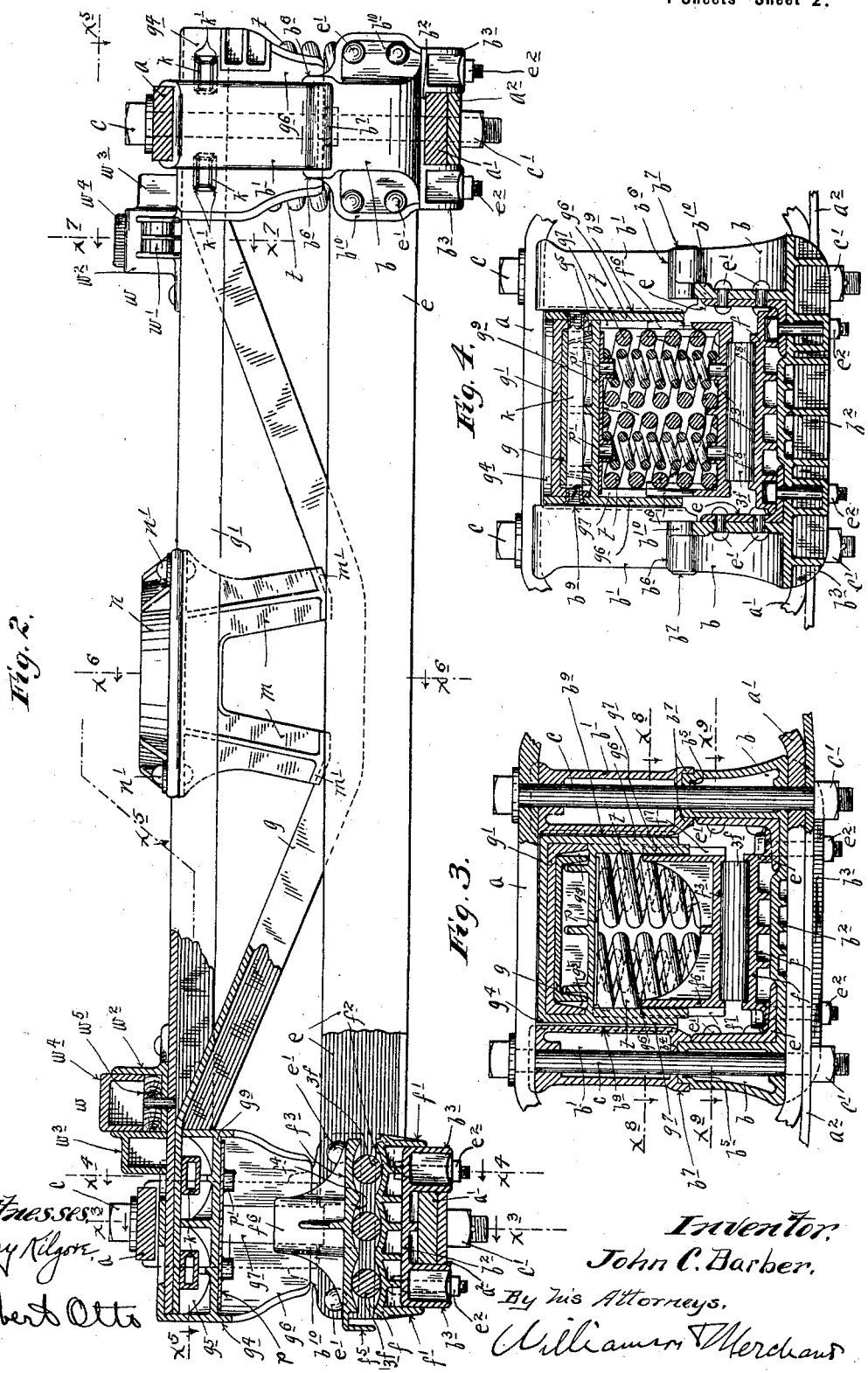

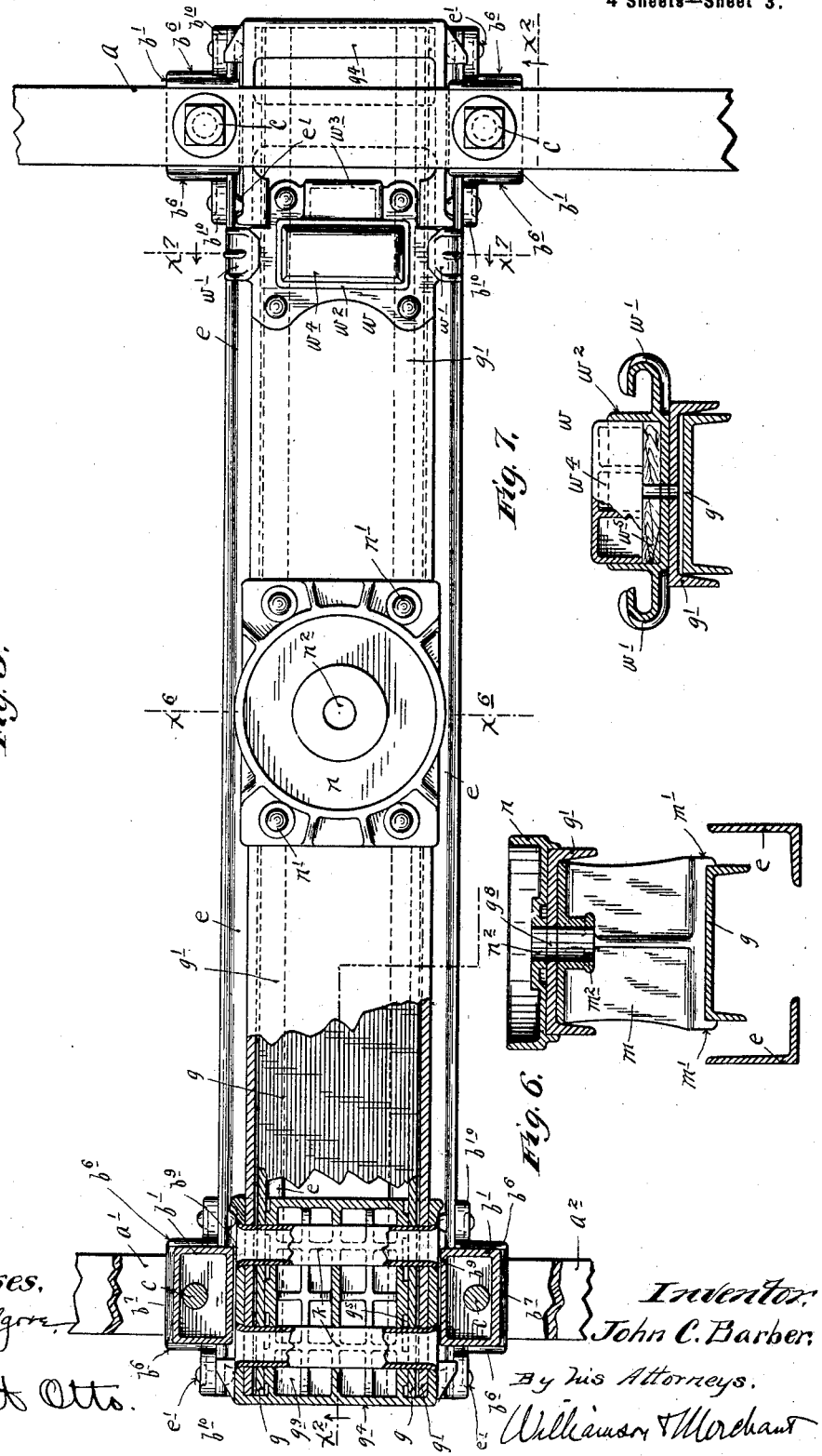

No. 660,614. Patented Oct. 30, 1900.
J. C. BARBER.
CAR TRUCK.
(Application filed Apr. 7, 1900.)
(No Model.)
4 Sheets—Sheet 4.
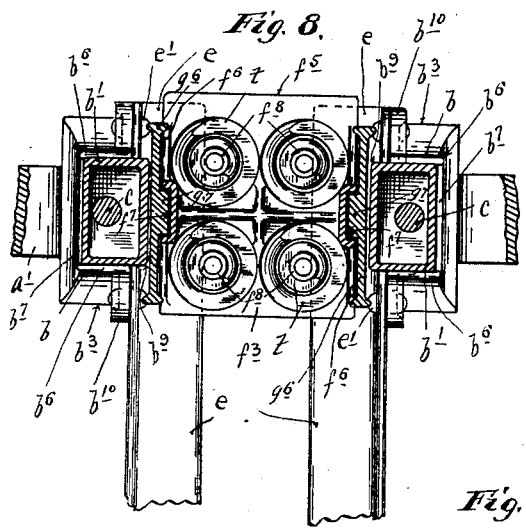
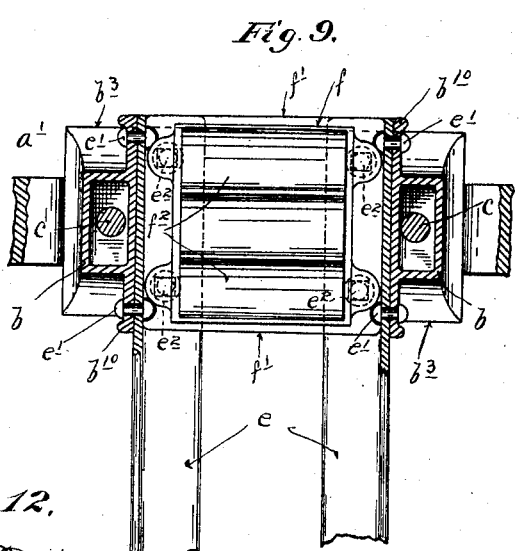
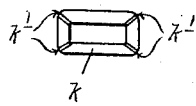
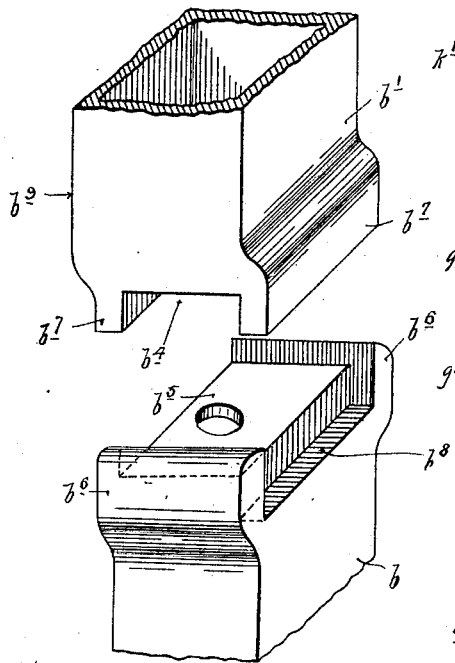
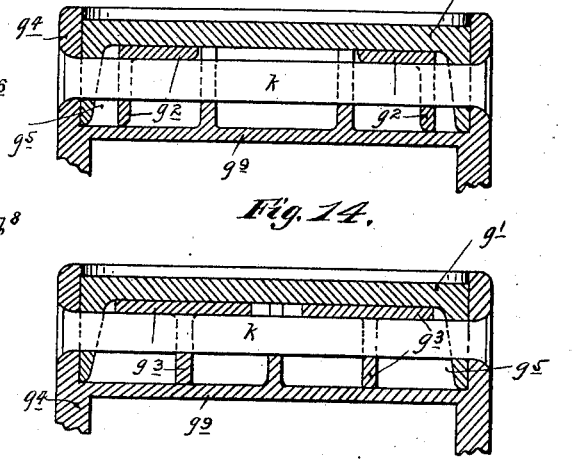
Witnesses,
Harry Kilgore,
Robert Otto.
Inventor,
John C. Barber,
By his Attorneys,
Williamson & Merchant

UNITED STATES PATENT OFFICE.

JOHN CHILD BARBER, OF ST. PAUL, MINNESOTA.

CAR-TRUCK.

SPECIFICATION forming part of Letters Patent No. 660,614, dated October 30, 1900.

Application filed April 7, 1900. Serial No. 11,920. (No model.)

*To all whom it may concern:*

Be it known that I, JOHN CHILD BARBER, a citizen of the United States, residing at St. Paul, in the county of Ramsey and State of Minnesota, have invented certain new and useful Improvements in Car-Trucks; and I do hereby declare the following to be a full, clear, and exact description of the invention, such as will enable others skilled in the art to which it appertains to make and use the same.

My present invention relates to car-trucks, and has for its object to improve the same in point of strength, durability, and cheapness of construction; and to such ends it consists of the novel devices and combinations of devices hereinafter described, and defined in the claims.

The invention is illustrated in the accompanying drawings, wherein like characters indicate like parts throughout the several views.

Figure 1 is a view in side elevation, with some parts dotted and others removed, illustrating a car-truck constructed in accordance with my invention. Fig. 2 is a transverse vertical section taken through the truck approximately on the line $x^2 x^2$ of Fig. 5. Fig. 3 is a vertical section approximately on the line $x^3 x^3$ of Fig. 2. Fig. 4 is a vertical section approximately on the line $x^4 x^4$ of Fig. 2. Fig. 5 is a view, principally in plan, but partly in horizontal section, on the line $x^5 x^5$ of Fig. 2. Fig. 6 is a vertical section on the line $x^6 x^6$ of Figs. 2 and 5. Fig. 7 is a vertical section on the line $x^7 x^7$ of Figs. 2 and 5. Fig. 8 is a horizontal section on the line $x^8 x^8$ of Fig. 3, some parts being broken away. Fig. 9 is a horizontal section on the line $x^9 x^9$ of Fig. 3, some parts being broken away. Fig. 10 is a perspective view showing portions of one of the bolster-columns with the sections thereof drawn apart, some parts being broken away. Fig. 11 is a plan view of a key used in the bolster. Fig. 12 is an end view of the said key; and Figs. 13 and 14 are detailed views illustrating slightly-modified constructions, the lines of their sections corresponding to that of Fig. 4.

Of the standard parts of the truck the reference-letters $a$, $a'$, and $a^2$ indicate, respectively, the top bar, the truss-bar, and the bottom bar of the trussed side frames, and the dotted circles $a^3$ indicate the truck-wheels. The wheel-axles are of course journaled in boxes, (not shown,) which will be secured to the side frames in the ordinary manner.

The bolster-columns are, as a feature of this invention, formed of sections $b$ and $b'$, the lower sections $b$ being rigidly connected in pairs by base saddles or bridges $b^2$, formed integral therewith, the parts being preferably of malleable iron, although they may be of cast-steel. The saddle or bridge portions $b^2$ of the bolster-columns rest directly upon the central horizontal portion of the truss-bar $a'$, and they are formed with parallel saddle trusses or twin girders $b^3$, preferably in the form of ribbed channels that embrace the engaged portion of the frame-bars $a'$ and $a^2$, as best shown in Figs. 1 and 2. The very important function of this saddle or bridge formed integral with the lower portions of the bolster-columns will be more fully stated later on. The sections $b$ and $b'$ of the bolster-columns are interlocked midway up the columns by lapped joints, as best shown in detail in Fig. 10, wherein the upper members $b'$ are formed with transversely-extended open grooves $b^4$, that snugly fit a block portion $b^5$ on the upper ends of the sections $b$. The upper ends of the sections $b$ have laterally-spaced flanges $b^6$, that rise above the block portion $b^5$ and closely fit and embrace the sides of sections $b'$, surrounding the open extremities of the channel $b^4$. The outer edge of the block portion $b^5$ is preferably set inward of the outer surface of the column-section $b$, so that the outer flange $b^7$ of the upper section $b'$ will fall into a seat $b^8$ when the bolster-sections are put together. This construction gives an extremely strong joint, which is especially rigid transversely of the truck, so that it is adapted to resist the lateral strain. The joint is also cheaply fitted, as an emery-wheel or other tool may be readily run transversely through the channel $b^4$ and between the flanges $b^6$. Column-bolts $c$ are passed vertically through the bars $a$, $a'$, and $a^2$ and through the column-sections $b$ and $b'$, being provided at their lower ends with nut $c'$. As best shown in Fig. 3, the sections of the bolster-columns are cored out or cast hollow and are provided at their end portions with bolt-passages that closely fit the bolts $c$. By reference particularly to Figs. 3 and 4 it will be noted that when the bolster-sections are put together the inner surfaces of the upper sections $b'$ project inward of the inner surfaces of the lower sections $b$ to form a chafing-surface $b^9$ for the bolster caps or hoods.

The trussed side frames are tied together at their lower portions and secured in position and in line, preferably, by a pair of steel angle-bars, the ends of which are directly secured in the angles formed between the saddles or bridge portions $b^2$ and the column-sections $b$. As shown, the upper flanges of the tie-bars $e$ are secured to transverse flanges $b^{10}$ of the column-sections $b$ by rivets $e'$, while the lower or horizontal flanges of said bars $e$ are secured to the saddle or bridge portion $b^2$ by short nutted bolts $e^2$, passed through said tie-bars and through the girders $b^3$ of the said saddle or bridge. The heads of the bolts $e^2$ fit in seats or pockets in the bottoms of the roller-seats $f$, and thus are prevented from turning and at the same time assist in holding said roller-seats $f$.

The lower roller seat or bearing $f$ is constructed independently of the saddle or bridge $b^2$, and hence may be of cast-steel, while the said saddle may be of malleable. Such construction has an obvious importance, since it is evident that said bearing must be hard to withstand the weight and wear transmitted thereto by the rollers. To secure said roller-seat $f$ on the saddle $b^2$, between the columns, it is provided with depending side flanges $f'$, that embrace the outer sides of the saddle-girders $b^3$. On its upper face the said roller-seat or bearing-plate is formed with a plurality of cylindrical depressions $f^2$, adapted to receive the rollers $3^f$.

The so-called "roller-cap" or "spring-seat" $f^3$ is provided on its under surface with cylindrical concavities $f^4$, corresponding to the concavities $f^2$ of the roller-seat $f$ and coöperating one with each of the bearing-rollers $3^f$. At its outer edge the said cap or seat $f^3$ has a depending guard-flange $f^5$, and at its forward and rear central portions it is provided with guide-heads $f^6$, having vertical guide-channels $f^7$, for a purpose hereinafter set forth. The springs to be hereinafter noted engage at their lower ends with ribs or flanges $f^8$, formed on the upper face of the said cap or seat $f^3$.

The truck-bolster also involves novel features. As preferably constructed, both the tension and compression members $g$ and $g'$, respectively, are channel-bars, the former fitting at its ends within the latter, the flanges of both being turned downward. However, in lieu of the channel-bar $g$, for instance, a pair of laterally-spaced angle-bars $g^2$ may be employed, as shown in Fig. 13, or a pair of T-bars $g^3$ may be employed, as shown in Fig. 14. To secure the interlapped ends of the members $g$ and $g'$ together, a cap or hood $g^4$ is applied at each end of the bolster. These caps $g^4$ have socket portions $g^5$, into which the interlapped ends of the bars $g$ and $g'$ are adapted to be snugly telescoped. To interlock the ends of the said bars $g$ and $g'$ together and to the cap or hood $g^4$, the walls of said socket-section $g^5$ and the flanges of said bars are pierced or perforated to receive one or more keys $k$, that are passed therethrough. For very heavy construction two keys are advisably employed for each cap or hood. These keys are in their best form hollow and provided with corner slits $k'$ at their ends. These slits adapt the ends of the keys to be readily expanded, and the perforations in the walls of the cap or hood being flared outward the keys when expanded at their ends may be securely locked in position, as best shown in Fig. 5. When the keys are secured, the tension and compression members and the caps of the bolster are securely locked together in a very substantial and simple manner. The keys are preferably malleable castings; but they might of course be of roll-steel, cast-steel, or wrought-iron.

The sides of the bolster caps or hoods $g^4$ are extended downward in the form of webs $g^6$, the outer surfaces of which bear against the chafing-surfaces $b^9$ of the bolster-columns. On their inner sides the depending webs $g^6$ are formed with vertical guide-ribs $g^7$, that work in the guide-channels $f^7$ of the roller-caps or spring-seats $f^3$. This engagement of the guide-flanges $g^7$ with the vertical grooves of the roller-caps permits free vertical movements of the bolster and causes the said roller-cap to move transversely with the bolster, always holding the same so as to prevent the springs from being disturbed or thrown out of vertical positions by the forces due to lateral shocks on the truck.

The central portions of the tension and compression members $g$ and $g'$ are spaced apart vertically by a center truss column or strut, (indicated as an entirety by the letter $m$.) At its upper portion this center column fits snugly between the flanges of the channel-bar $g'$, and at its lower end it is provided with parallel flanges $m'$, that embrace the upper portion of the channel-bar $g$. The flanges $m'$ prevent the base of the column from shifting transversely of the channel-bar $g$. At its central portion the column $m$ is formed with a depending sleeve $m^2$, the perforation of which is in direct line with a perforation $g^8$ in the central portion of the channel-bar $g'$. The top of the column $m$ engages the compression-channel $g'$ and acts as a reinforcement directly underlying the center bearing-plate $n$, being preferably secured by the center-plate rivets $n'$. At its center the plate $n$ is provided with a perforation $n^2$, through which and the registered perforations $g^8$ and $m^2$ the king-bolt (not shown) may be passed.

The spring-caps are in the form of flat plates $p$, that bear against the under walls $g^9$ of the sockets $g^5$, being held against horizontal movements by surrounding flanges of the caps or hoods $g^4$. These spring-caps $p$ preferably have bosses $p'$, with which the upper ends of the bolster-springs $t$ engage. The lower ends of the said springs $t$, as already indicated, engage the flanges $f^8$ of the roller-caps $f$.

On the upper surface of the bolster member $g'$, just inward of each side frame, is secured a casting designed to serve as a combined brake-hanger bracket, side bearing, and striking-foot. This casting is indicated as an entirety by the letter $w$, and it is formed with hook portions or extensions $w'$, to which the brake-link may be secured, and with a pocket $w^2$ and extensions $w^3$. The extensions $w^3$ normally stand close to but out of engagement with the adjacent top bar $a$ of the side frame, and under movements of the bolster transversely of the truck the portions $w^3$ serve as a striking block or foot to limit the endwise movement of the bolster transversely of the truck. A side-bearing chafing-shoe $w^4$ fits within the pocket $w^2$, and a shimming-block $w^5$ at the bottom of the said pocket adjustably supports the said shoe.

Cars of modern construction are essentially of very great carrying capacity, and much difficulty has been experienced in providing devices which will prevent the intense strains of the loads from bending or bowing downward the spring foundation between the columns. Hence I provide the so-called "saddle" or "bridge" having the side girders, which greatly stiffen and strengthen the side frames between the columns. As the girders embrace the lower bars of the side frames and as the saddles or bridges are tied together by the transverse tie-bars the truck-frame is greatly strengthened also against torsional strains or strains exerted on a horizontal plane, thus preventing the truck-frame from getting out of square. This construction best meets the demands for a truck of greatly-increased capacity.

The truck above described while extremely rigid is made up of few parts and requires but few rivets. It will be understood that modifications may be made therein within the scope of my invention. The pair of angle-iron tie-bars $e'$ are preferred to a single channel-beam for the reason that cinders and dirt may fall from between the same. Nevertheless the channel $e$ might be substituted for the pair of angle-irons, and while not the full equivalent thereof for the reason above indicated would in a broader sense be the equivalent of the construction defined by the expression "tie-bars connecting the columns."

The truck-bolster, while exceedingly strong, is of cheap construction for the reason that but few parts are used, and these parts are adapted to be quickly set up or put together with the use of but very few rivets. In fact the main parts of the bolster are securable by the keys $k$. Again, it will be understood that the construction of this bolster may be varied within the scope of my invention.

What I claim, and desire to secure by Letters Patent of the United States, is as follows:

1. In a car-truck a column incorporated in one of the side frames thereof, which column is formed in sections united by a lapped joint having an elongated or extended bearing transversely of the truck, substantially as described.

2. In a car-truck, a column constructed in sections, united by a lap-joint formed by an open channel in one section fitting a rib or head on the other section, substantially as described.

3. In a car-truck a pair of columns constructed in sections united by lap-joints, the lower column-sections being formed integral with a saddle or bridge that rests upon and embraces the side-frame truss-bar, substantially as described.

4. In a car-truck, the combination with the trussed side frames, of saddles or bridges reinforcing the truss-bar between the columns and provided with parallel hollow or channel-like girders $b^3$ embracing said truss-bar and columns, at least the lower parts of which are formed integral with said saddle or bridge, substantially as described.

5. In a car-truck, the combination with the trussed side frames, of columns therefor constructed in detachable sections, and transverse tie-bars connecting the corresponding lower column-sections of the opposite side frames, substantially as described.

6. In a car-truck, the combination with the trussed side frames of columns formed in sections, saddles or bridges formed integral with the lower column-sections and reinforcing the truss-bar between said columns, and transverse tie-bars rigidly connecting the lower column-sections of the opposite side frames, substantially as described.

7. In a car-truck, the combination with the trussed side frames, of the bolster-columns therefor formed in sections, the lower sections being formed integral with a saddle or bridge, resting upon and reinforcing the truss-bar between the columns, column-bolts passed through said sectional columns and the side-frame bars, and a transverse tie-bar rigidly connecting the lower column-sections, substantially as described.

8. The combination with a trussed side frame, of the saddle or bridge $b^2$, having the parallel girders $b^3$ embracing the truss-bar, and formed integral with the column-sections $b$, said columns being completed by the detachable sections $b'$, said sections $b$ projecting inward at $b^9$ to form chafing-surfaces, and column-bolts passed through said sectional columns and the bars of the trussed side frames, substantially as described.

9. The combination with the trussed side frames, of the sectional columns $b$, $b'$, the saddles or bridges constructed integral with the column-sections $b$, and having the twin girders $b^2$ embracing the frame truss-bar, and the transverse tie-bars $e'$ riveted to flanges of the column-sections $b$ and secured by bolts $e^2$ to said twin girders $b^3$, substantially as described.

10. A truck-bolster comprising a pair of channel-bars interlapped at their ends and spaced apart at their centers, caps or hoods engaging over the interlapped ends of said bars, and one or more keys each passed through both walls of said hood, and both flanges of both channel-bars, substantially as described.

11. A truck-bolster comprising bars drawn together at their ends, caps fitting over the ends of said bars, and a hollow key having corner slits at one or more ends, said key being insertible through seats in said bars and cap and adapted to be expanded, to secure it in position, substantially as described.

12. In a truck-bolster, the combination with the channel-bars $g$ and $g'$ secured at their ends with their flanges interlapped as described, of the center column or strut $m$ fitted between the flanges of the channel-bar $g'$ and having the flanges $m'$ embracing the channel-bar $g$ and holding the same against lateral movements, substantially as described.

13. The combination with a truck-bolster of casting secured thereto, said casting having the brake-supporting hooks $w'$, the pockets $w^2$ and the stop projections $w^3$, said parts operating substantially as described.

14. In a car-truck, the combination with trussed side frames involving vertical columns, of a pair of angle-irons tying together the lower portions of transversely-opposite columns, and spaced apart to permit dirt to pass between them, substantially as described.

In testimony whereof I affix my signature in presence of two witnesses.

JOHN CHILD BARBER.

Witnesses:
L. W. BARBER,
L. C. JEWELL.